Oct. 28, 1952
R. C. RANKIN
2,615,255
DELINEATOR FOR DETERMINING THE LENGTH AND
END FORM OF CONNECTING PIPES
Filed March 7, 1950
2 SHEETS—SHEET 1
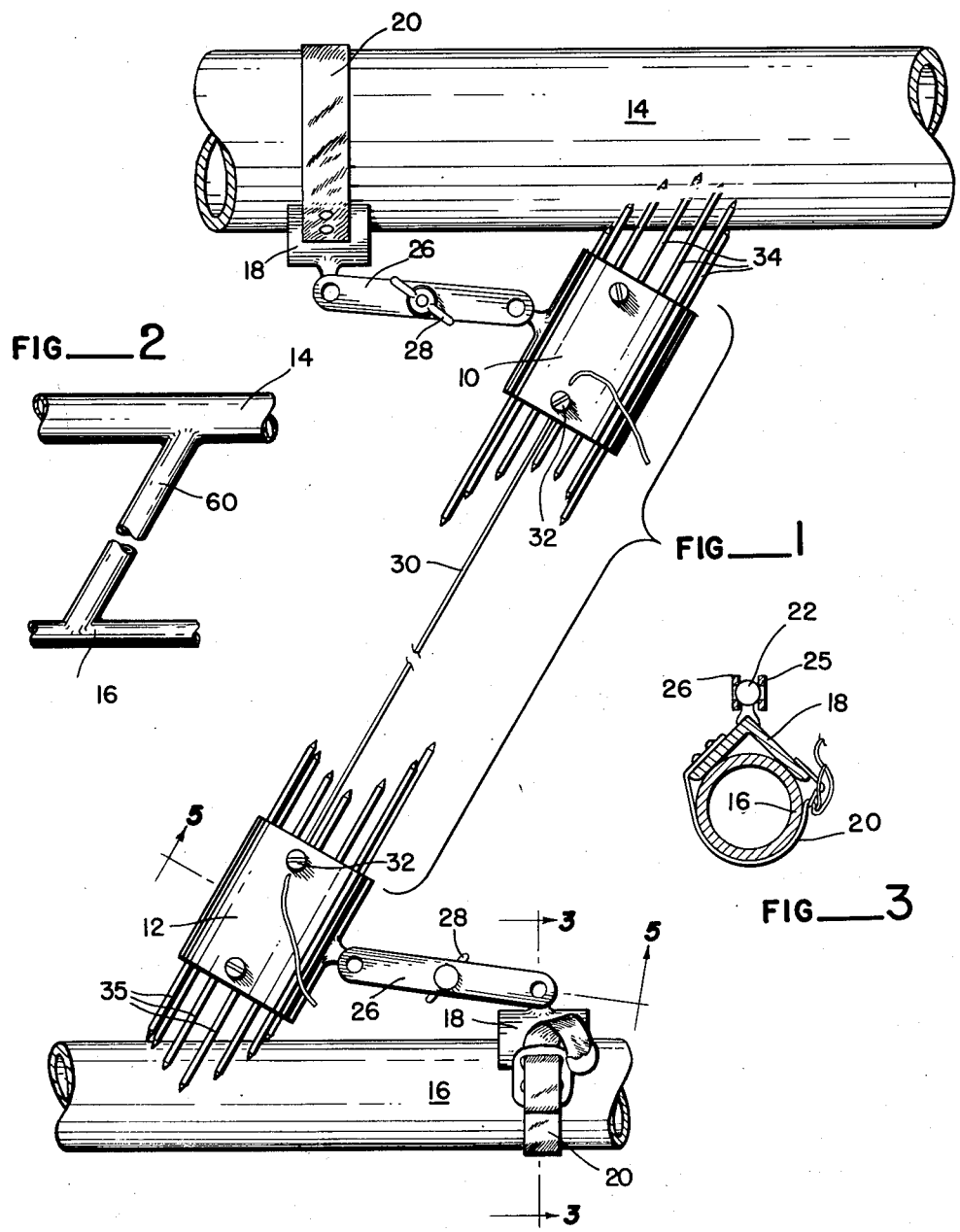
ROBERT C. RANKIN
Inventor
By Smith & Tuck
Attorneys Oct. 28, 1952 — R. C. RANKIN — 2,615,255
DELINEATOR FOR DETERMINING THE LENGTH AND END FORM OF CONNECTING PIPES
Filed March 7, 1950 — 2 SHEETS—SHEET 2
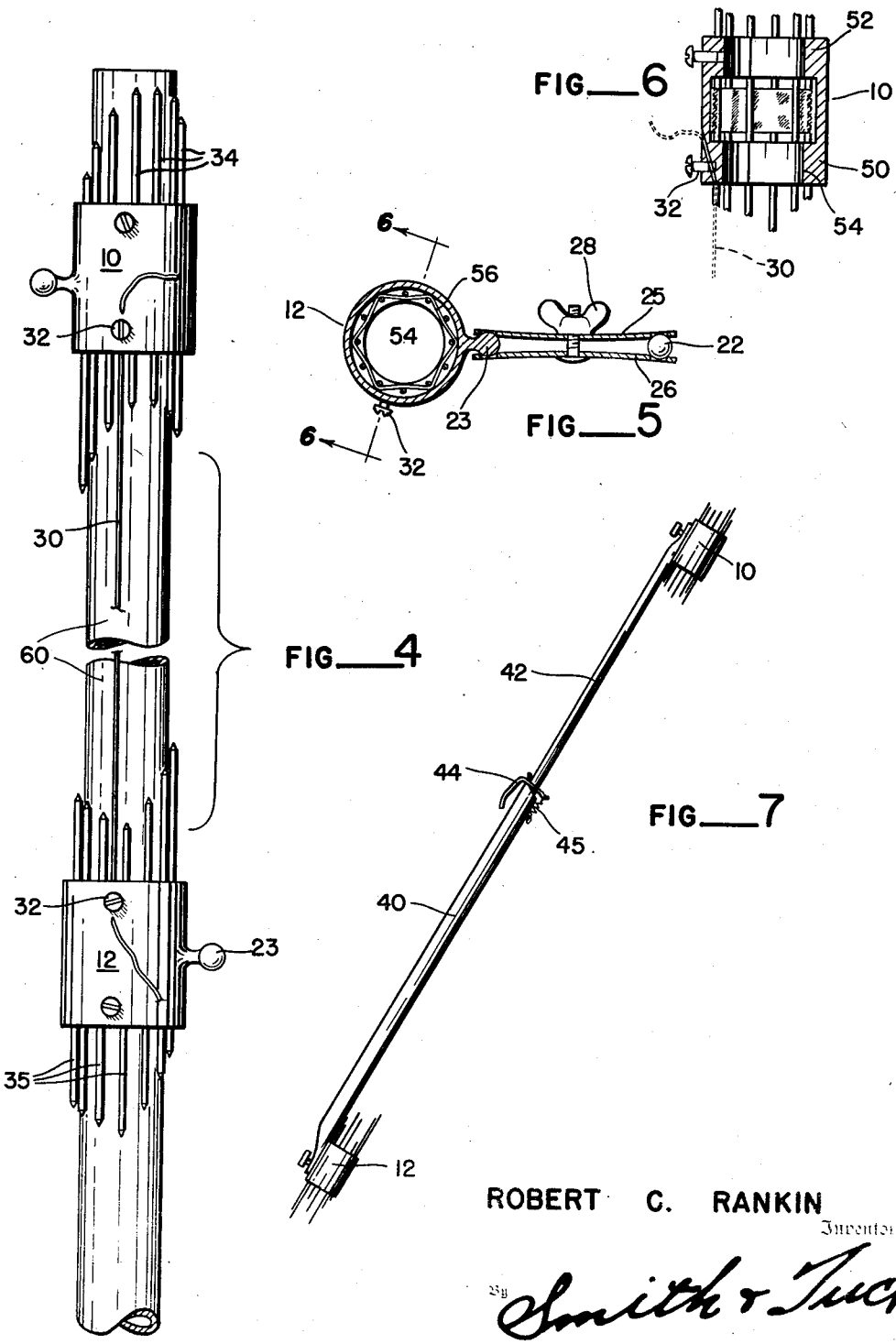
ROBERT C. RANKIN, Inventor
By Smith & Tuck, Attorneys Patented Oct. 28, 1952

2,615,255

UNITED STATES PATENT OFFICE 2,615,255

DELINEATOR FOR DETERMINING THE LENGTH AND END FORM OF CONNECTING PIPES

Robert C. Rankin, Seattle, Wash.

Application March 7, 1950, Serial No. 148,209

5 Claims. (Cl. 33—175)

This present invention provides means for determining the length of a pipe which is to join two other pipes. The device consists normally of two conformators which are suitably connected together so that the length of the connecting pipe can be accurately determined and the conformators will give the actual profile of the cuts to be made in the end of that pipe, to the end that a connecting pipe can be fitted accurately between two other pipes and the minimum weld will complete a secure, leak-proof joint.

As labor costs have been gradually increasing in the plumbing trade, it has been found necessary to seek out the most expeditious means and methods for coupling pipes together. In the smaller sizes copper tubing has, to a large degree, displaced the old iron pipe involving the various screw-on fittings, and in the larger sizes of pipes the present technique is to weld the various pipe portions together so as to avoid the time consuming means of cutting, threading and screwing together of the various lengths of pipe to achieve a plumbing installation. There are many advantages in this technique, in that there is no fixed angles at which pipes must be joined, but the angle can be suited to the most expeditious route. In making welded joints, however, it is essential that the various pipes which are joined together shall be cut accurately so that no expensive filling is required by the welder. On the other hand, it is necessary that means be provided so that more accurate cuts can be made on the ends of a pipe and thus avoid the former laborious process of gradually cutting out portions of the pipe until a fit was achieved.

In the past many devices have been produced for assisting in determining the end cut for pipes. The majority of these devices however, have been very expensive, bulky units, which did not lend themselves, very practically, to on-the-job use, even though they were very accurate in determining cuts for shop fabrication where joints could be made with the bulky equipment available and under ideal conditions for use. None of these devices, however, made provision for determining the length of a pipe used to connect in between two other pipes. This was normally determined by a tape measure or rule, but the cuts on the ends of the pipe do not conform to any geometrical pattern and it was always difficult to properly apply the dimension just measured to insure that it would be reasonably accurate. In this present equipment means is provided for spacing apart two conformators of unique design, which are then set to the exact cuts required by actual contact with the pipes to which juncture is to be made and then the entire device with the connecting means is removed and placed on the pipe that is to be cut, thus in one operation, accurately determining the end cut forms, and the exact length. This is believed to be a very useful, forward step in this field, as it not only saves a great deal of time of the skilled craftsman employed, but it also insures that the cut will be accurately made and will be tight fitting, so that a minimum of weld is required to form a secure joint.

The principal object of this invention is to provide a delineator which will determine the cut forms for the ends of a connecting pipe and also give its accurate length, all in a single operation.

A further object of this invention is to provide a delineator for measuring the cuts and lengths of a connecting pipe which will be compact, easily transported by the workmen, and which because of its small size can be easily and practically employed on the job.

A further object of this invention is to provide means whereby the orifices to be cut in the pipes connected together can be accurately determined so that a single application of the device will give all the information needed to cut the orifices, to cut the pipe to length and to cut the end form on the connected pipe so that the three units can be accurately joined together.

A further object of this invention is to provide a simple efficient and economical means for determining the various cuts required in fitting a connecting pipe between two other pipes, and which connecting pipe may be disposed at any convenient or desired angle.

A further object of this invention is to provide a simple and easily operated delineator for fitting a connecting pipe.

A further object of the device is to delineate the profile of the cuts required at each end of a pipe in fabricating a welded-in connection between two pipes.

Further objects, advantages and capabilities will be apparent from the description and disclosure in the drawings, or may be comprehended or are inherent in the device.

In the drawings:

Figure 1 is a view in elevation with certain parts broken away and sectioned, showing one application of the delineator of this present invention;

Figure 2 is a view on reduced scale showing the manner in which the two pipes of Figure 1 are ultimately joined together;

Figure 3 is a cross-sectional view taken along the lines 3—3 of Figure 1;

Figure 4 is a plan view of a pipe with the delineator applied thereto, showing the means by which the connecting pipe is cut to conform to the needs of joining two pipes;

Figure 5 is a cross sectional view taken along the broken line 5—5 of Figure 1;

Figure 6 is a cross section view taken along the lines 6—6 of Figure 5;

Figure 7 is an elevational view of an alternate arrangement for holding the two conformators in spaced relationship.

Referring more particularly to the disclosure in the drawings, the numerals 10 and 12 designate respectively the two co-acting scribing devices or conformators. These are adjustably secured to the two pipes it is desired to connect together, as the pipes 14 and 16. A convenient means for securing the conformators in their adjusted position, and one of which facilitates the adjustment thereof, is that shown in Figures 1 and 5. The clamp members consist essentially of a V-shaped base member 18, which can be secured in place on the pipe as by a strap 20, or the same may be merely tack welded to the pipe. The base member 18 is provided with a ball member as 22, and a similar ball member, as 23, is formed as part of each of the conformators 10 and 12. Adapted to engage these ball members are two spaced bars, as 25 and 26, which can be adjustably clamped together by means of the bolt and wing nut 28. The ends of bars 25 and 26 must be deformed to provide seats for the ball units, or more simply, they may be just provided with openings that will provide a definite seat. When the conformators are generally clamped in their desired position it is then necessary to insure axial alignment of the two units. This is most conveniently done by employing a tension member 30, preferably formed of piano wire, which can be adjustably secured in each of the conformators as by screws 32. The alignment of the conformators then is most easily achieved by extending in each of the units the adjacent pins, as 34 and 35, and aligning the tension member 30 with these pins.

It has been found that by sighting transversely over the pins 34 and 35 and the tension member 30, which may be a cord or preferably a wire, very accurate alignment can be obtained with very little experience on the part of the user. The wire connector 30 has a distinct advantage in that it is very easily transported and will conveniently fit in any tool kit. An alternate arrangement is shown in Figure 7, in which two telescoping tubes, as 40 and 42 are employed, each of which is in turn secured to the conformators and the tubes are held in their adjusted relationship by the well known type of clamping means indicated generally at 44, in Figure 7. This clamp consists of the member 44, which is pierced with a hole just slightly larger than tube 42, and is pivoted on tube 40 and employs a tension spring 45 that locks the same and a secure lock of the two tubes is thus achieved. This form of clamp is quite generally used on jacks and adjustable struts, and the like.

Each of the conformators is similar in construction and consist of an annular housing 50 having an inwardly extending flange at each end thereof as 52, and 54. This flange is drilled with holes that are disposed equally and spaced concentrically with respect to member 50, and parallel to the longitudinal axis thereof, and provide seats for a plurality of scribings pins, as 34 and 35. These pins are normally held in adjusted longitudinal position by the resilient member 56, which after the showing in Figure 5, it will be observed is alternately disposed over and under the adjacent pins. In this manner a slight pressure is placed on the pins which tends to hold them in their longitudinal adjusted position within member 50.

When the device is set up, after the showing of Figure 1, and the two conformators axially aligned, then the individual rods as 34 and 35 are moved outwardly until they engage their respective pipes, as 14 and 16. When all the pins are in contact with their associated pipes the points of contact are marked on the pipes and they thus form a trace showing the form of the cut that must be made in these pipes. The workman will normally make an adjustment as to where he makes his cut in accordance with whether he wishes the connecting pipe to fit inside the hole he is going to cut, or to merely abut the original pipes, as 14 and 16. In any event, however, it is merely making a slight radial adjustment from the point indicated by pins 34 and 35. When all the pin contact points have been adequately marked, the device, consisting of the two conformators and the connecting members 30, or the tubes 40 and 42, are removed. This is most conveniently arranged by merely releasing wing nuts 28 and slipping the ball members 23 out from the clamp arrangement.

The operator is now ready to cut the connecting pipe 60. His first operation is to thread both of the conformators on pipe 60 and to then, as previously described, align the two conformators by means of the wire 30, if that form is used, or by means of the collapsible tubes 40 and 42, if that form is used.

In Figure 4 the at present preferred form of this device is shown and it is believed it will be apparent that if the outboard ends of the various pins are marked on pipe 60 that a true form of the ends of this pipe will be marked and the overall length will be exactly correct to fit in between the two openings cut in pipes 14 and 16.

It is believed that it will be clearly apparent from the above description and the disclosure in the drawings that the invention comprehends a novel construction of a delineator for determining the length and end form of a connecting pipe.

Having thus disclosed the invention, I claim:

1. A delineator for determining the length and end forms of a connecting pipe, comprising: a pair of conformators; said conformators each including a base having a round bore adapted to slip over the connecting pipe to be delineated, a multiplicity of scribing pins disposed in a circle about said bore, and means for adjustably securing said pins in longitudinal position; a member associated with each conformator, connected at one end to said conformator by a ball and socket joint and said member having clamp means, connected to the other end of said member by a ball and socket joint, for securing said member to a pipe to which said connecting pipe is to be connected, said member having adjustable locking means for locking said ball and socket joints; and a tension wire having one end releasably secured to one conformator and having its other end secured to the other conformator, said wire being flexible and permitting free movement of said conformators toward each other.

2. A delineator for determining the length and end forms of a connecting pipe, comprising: a pair of conformators; flexible connecting means adapted to adjustably space said conformators apart and provide means for adjusting said conformators in axial alignment; said conformators each including a base having a round bore adapted to slip over the connecting pipe to be delineated, a multiplicity of scribing pins disposed about said bore with their axes parallel to the axis of said base, and an annular resilient member positioned in said base and threaded between said pins, running on the inside of half of said pins and on the outside of the other half of said pins alternately on adjacent pins thereby resisting longitudinal movement of said pins; and clamp means associated with each conformator to adjustably secure said conformator to a pipe to which said connecting pipe is to be connected.

3. A delineator for determining the length and end forms of a connecting pipe, comprising: a pair of conformators; said conformators each including a base having a round bore adapted to slip over the connecting pipe to be delineated, a multiplicity of scribing pins disposed in a circle about said bore with their longitudinal axes parallel to the longitudinal axis of said bore, and an annular resilient member positioned in said base in contact with said pins to resist longitudinal movement of said pins; and a tension wire having one end releasably secured to one conformator and having its other end secured to the other conformator, said wire being flexible and permitting free movement of said conformators toward each other.

4. A delineator for determining the length and end forms of a connecting pipe, comprising: a pair of conformators; said conformators each including a base having a round bore adapted to slip over the connecting pipe to be delineated and a multiplicity of scribing pins disposed in a circle about said bore; and a tension wire having one end releasably secured to one conformator and having its other end secured to the other conformator, said wire being flexible and permitting free movement of said conformators toward each other.

5. A delineator for determining the length and end forms of a connecting pipe, comprising: a pair of conformators; a tension wire having one end releasably secured to one conformator and having its other end secured to the other conformator, said wire being flexible and permitting free movement of said conformators toward each other; said conformators each including a base having a round bore adapted to slip over the connecting pipe to be delineated and a multiplicity of scribing pins disposed in a circle about said bore; and a clamp member associated with each conformator including strap means for securing said clamp member to a pipe to which such connecting pipe is to be connected and a link member connecting the clamp member and its conformator in a manner permitting manual adjustment of the position of the clamp member in relation to its conformator and permitting the manual securing of the clamp member in such adjusted position in relation to its conformator.

ROBERT C. RANKIN.

REFERENCES CITED

The following references are of record in the file of this patent:

UNITED STATES PATENTS

| Number | Name | Date |
| --- | --- | --- |
| 397,132 | Kimball | Feb. 5, 1889 |
| 776,713 | Wurts | Dec. 6, 1904 |
| 1,520,143 | Sandell | Dec. 23, 1924 |
| 2,073,089 | Autenrieth | Mar. 9, 1937 |
| 2,205,311 | Sabatello | June 18, 1940 |
| 2,334,422 | Lehnus | Nov. 16, 1943 |
| 2,380,919 | Bugenhagen | Aug. 7, 1945 |
| 2,421,882 | Hogue | June 10, 1947 |
| 2,466,464 | Moore | Apr. 5, 1949 |

FOREIGN PATENTS

| Number | Country | Date |
| --- | --- | --- |
| 347,224 | France | Feb. 28, 1905 |